Dec. 12, 1933.  R. H. KRESS  1,938,914
OIL PRESSURE AUTOMOBILE CLUTCH CONTROL
Filed Nov. 25, 1931     3 Sheets-Sheet 1
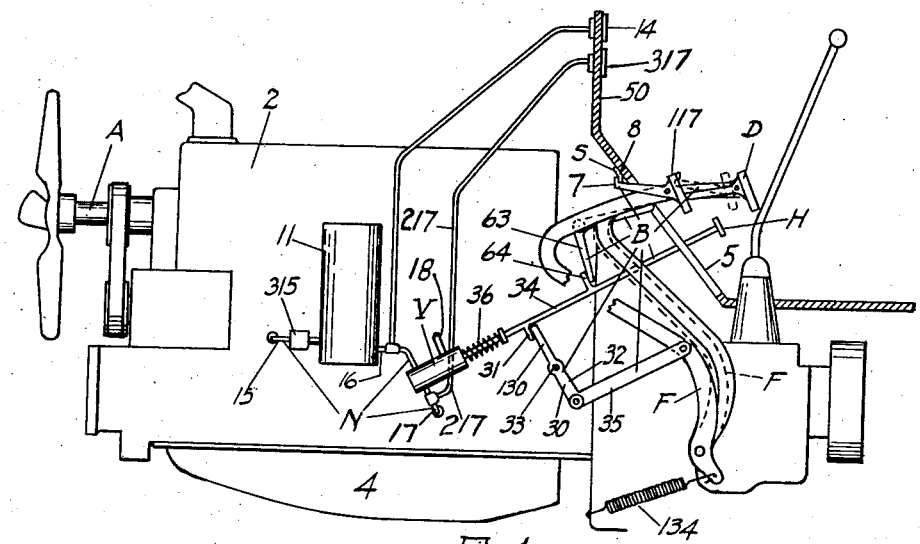
Fig. 1.
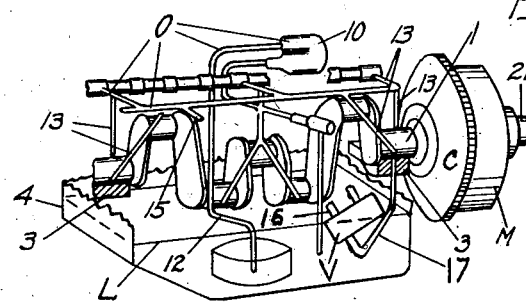
Fig. 2.
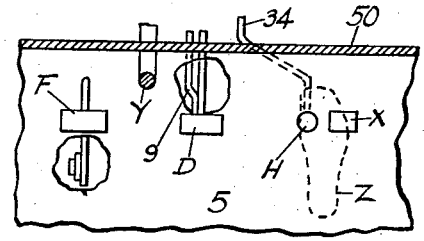
Fig. 3.
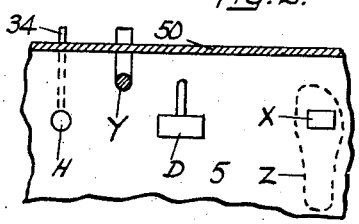
Fig. 4.
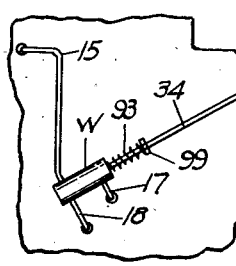
Fig. 5.
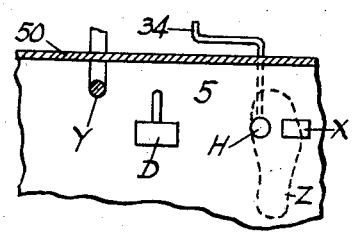
Fig. 6.
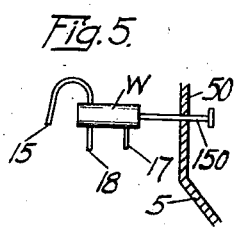
Fig. 6A.
Fig. 7.
INVENTOR
Ralph H. Kress
BY
Gardner W. Pearson
ATTORNEY Dec. 12, 1933.   R. H. KRESS   1,938,914
OIL PRESSURE AUTOMOBILE CLUTCH CONTROL
Filed Nov. 25, 1931   3 Sheets-Sheet 2

INVENTOR
Ralph H. Kress
BY
Gardner W. Pearson
ATTORNEY

Dec. 12, 1933.   R. H. KRESS   1,938,914
OIL PRESSURE AUTOMOBILE CLUTCH CONTROL
Filed Nov. 25, 1931   3 Sheets-Sheet 3

INVENTOR
Ralph H. Kress
BY
Gardner W. Pearson
ATTORNEY

Patented Dec. 12, 1933

1,938,914

UNITED STATES PATENT OFFICE 1,938,914

OIL PRESSURE AUTOMOBILE CLUTCH CONTROL

Ralph H. Kress, Lawrence, Mass.

Application November 25, 1931
Serial No. 577,219

4 Claims. (Cl. 192—85)

This invention relates to the control of automobiles and in some respects is an improvement on my application for Letters Patent filed on July 1, 1931, Serial No. 548,122 on Clutch control for automobiles.

In that application, I showed the clutch operated by pneumatic pressure or gas under pressure preferably utilizing the exhaust from the engine. This gas under pressure was conducted directly to a clutch of the disc or bellows type the flow being controlled by a valve operable from a button which extended through the foot board.

By pressure on this button, gas under pressure was admitted to the clutch thus causing the plates to engage and thereby connecting the engine drive shaft with the clutch shaft in such a manner as to cause the driving wheels to revolve and move the car.

That device and this does away with the usual clutch rod, yokes, pins etc. but where gas under pressure is used, the packing glands must be very tight or else there will be leaks and there may be rattling of parts.

This device, therefore, utilizes the oil under pressure in any of the well known oil pressure feed devices now in common use on automobiles.

Such devices usually suck oil from the bottom of the crankcase and force it under pressure to the various bearings of the crank shaft and main drive.

With this device the oil pressure system is tapped and preferably conducted to a closed tank in which air is trapped, this tank serving as a reservoir to maintain the pressure when the engine is stopped.

The oil under pressure is conducted from this tank to a valve which may be located outside the crankcase or inside the crankcase and may even be buried in the oil therein.

By means of one or more control rods running to the foot board, this valve is opened to allow the oil under pressure to flow into the clutch or is closed when spring devices expel the oil from the clutch through the valve and drain it into the crankcase where it can be used over again.

The control valve can be located in any convenient place and its control rod and control button can be positioned in other places than the foot board.

I prefer to use a special type of adjustable pressure regulating and relief valve but other types of valves, especially three way valves may be used.

In the drawings, Fig. 1 is a side elevation of part of an automobile including the engine casing, foot board, gear shift etc. with my preferred form of device in place.

Fig. 2 is a perspective view showing an oil pressure pumping system and where my oil pressure pipe is tapped in.

Fig. 3 is a plan view showing my preferred arrangement of foot board controls.

Fig. 4 is a plan view showing another arrangement of foot board controls.

Fig. 5 is a side elevation showing a simple form of valve connection with the oil pressure system and foot board control.

Fig. 6 is a plan view showing another arrangement of foot board controls.

Fig. 6A shows another valve control.

Fig. 7 is a side elevation showing the details of my preferred arrangement of brake pedal clutch control.

Figures 8, 9:
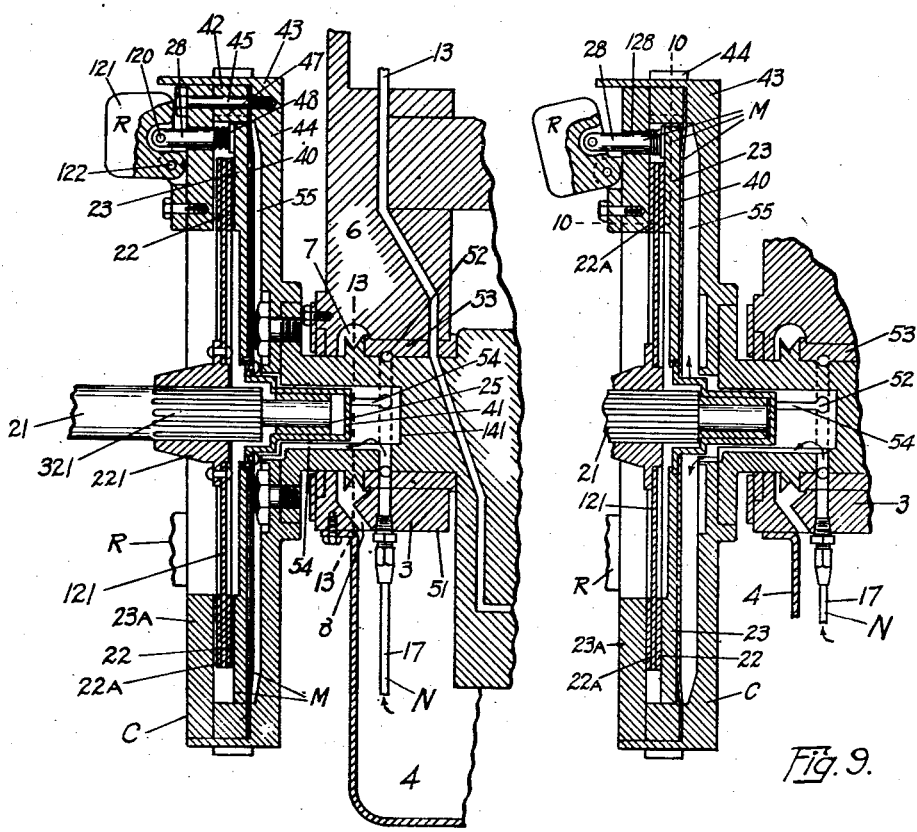
Fig. 8 is a vertical section of an oil operable clutch with the clutch plates disengaged.
Fig. 9 is a vertical sectional view similar to Fig. 8 of the same clutch with the clutch plates engaged.
Figure 10:
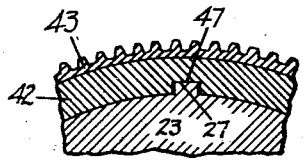
Fig. 10 is a vertical sectional detail on the line 10—10 of Fig. 9.

In the drawings, A represents the forward part of an automobile which would naturally have the usual four wheels, steering wheel and other well known parts including particularly a foot board 5, a motor 2 provided with a motor crank shaft 1 revoluble in bearings 3 positioned in a crankcase 4.

O represents an oil pressure lubricating system for the motor crank shaft 1 and bearings 3 of any usual and well known type. As shown, it includes a pump 10, an inlet pipe 12 from the crankcase 4, lubricating pipes 13 which extend to the bearings 3 and a gauge 14 on the instrument board.

Figure 15:
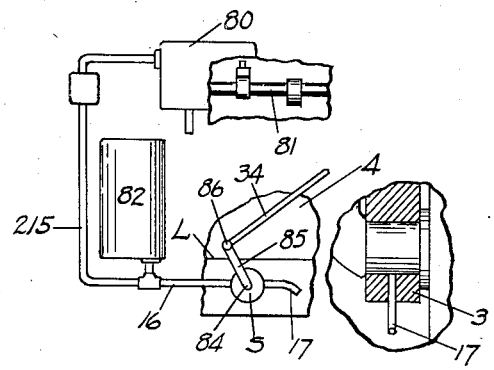
Fig. 15 is a diagrammatic side elevation showing a modified form of my device.

It also preferably includes a pressure storage tank 11 which may be outside as shown in Fig. 1 or in any convenient place inside as shown in Fig. 15 and a clutch control pipe N.

This clutch control pipe N extends to an oil pressure operable clutch C positioned between the motor crank shaft 1 and the clutch shaft 21 which connects with the usual drive wheels not shown. This clutch C includes clutch plates 22, 22A carried by the clutch shaft 21 preferably on the outer rim of a metal disc 121.

The clutch also includes a clutch plate 23 which forms part of an oil pressure operable member M. This clutch plate 23 is carried by a diaphragm 40 which as shown in Figs. 8 and 9 is formed with a thimble 41 which extends in and around the end 25 of clutch shaft 21 and into a pocket 141 in the end of crank shaft 1 and is clamped around its rim by means of rings 42 and 43 held together and to the fly wheel 44 carried by main crank shaft 1 by means of screws 45.

Plate 22 could be fixed on shaft 21 and could engage only plate 23 to transmit power, but I prefer to have hub 221 for disc 121 slidable in grooves 321 in shaft 21 in a well known manner. Normally it is in a free position between plate 23 and a plate 23A fixed to fly wheel 44.

By this arrangement, when diaphragm 40 moves towards disc 121 as shown in Fig. 9, plates 22A and 23A engage as well as 22 and 23.

The clutch plate 23 is shown as having projections 27 which enter grooves 47 whereby this clutch plate 23 can move in and out against the pressure springs such as 48 whenever the diaphragm 40 is forced outward or toward the left. When this happens, the clutch plates 22 and 23 engage, and 22A and 23A, if used, engage thus connecting the motor crank shaft 1 with the clutch shaft 21.

A clutch control valve V is interposed in the clutch control pipe line N, such valve having an outlet 18 which discharges into the crankcase 4 and being operative by valve control means B, including a rod 34 at the end of which is a button H which projects through the foot board 5 and is connected with the valve by any suitable mechanism which will be explained hereafter.

Clutch control pipe N includes the part 16 which leads from the bottom of tank 11 and the pipe 15 which leads from the oil pressure lubricating system O and a pipe 17 which enters the back bearing 51 of the motor crank shaft 1 at a point where it connects with an annular groove 52 preferably formed partly in the babbitt 53 for motor crank shaft 1 and in the crank shaft itself.

315 is a check valve and 217 a pressure gauge pipe for gauge 317.

As shown, there are three channels 54, 54, 54 which extend radially from this annular groove 52 to pocket 141 and thence along pocket 141 to the end of shaft 1 and to the chamber 55 formed in the fly wheel 44 behind diaphragm 40.

Through these conductors, that is groove 52 and channels 54, 54, 54, the oil pressure is conducted behind the diaphragm 40 to cause the clutch plates to engage.

7 is an annular channel to catch any oil which works past packing 53 and 8 is a drain from channel 7 to the crankcase 4.

To control the flow of oil under pressure from the oil pressure system O to the clutch C through a suitable clutch control pipe such as N, I may use any one of various types of three way valves and I may use any one of several foot control devices in the floor board some of which I will describe later.

It is desirable when starting to engage the clutch that pressure should gradually be applied and that when the maximum pressure is reached, such pressure should be maintained.

I, therefore, prefer to provide in my valve or in the clutch control device a suitable buffer spring or springs whereby a relatively small or slow stream of oil starts into the clutch preventing too sudden and too harsh an engagement. This allows a soft control and a slipping of the clutch in traffic and in certain other situations.

Figure 11:
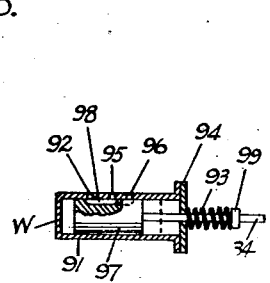
Fig. 11 is a vertical sectional view of a simple type of valve which I can use.
Figure 12:
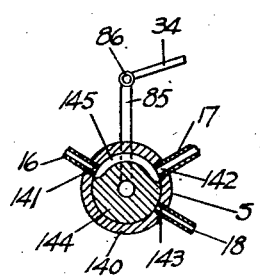
Fig. 12 is a vertical sectional view of another valve of a rotary type which I can use.
Figure 13:
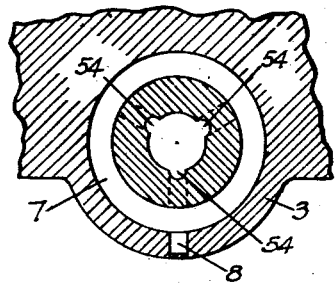
Fig. 13 is a vertical sectional view of parts on line 13—13 of Fig. 8.

The valve must be of the three way type and may be of the simple construction shown in Fig. 11 at W and the whole construction can be very simple as shown in Fig. 5.

A control rod 34 terminating in button H which extends to the foot board enters directly valve cylinder 91 having the port 92 which connects with a pipe 15 from the oil pressure lubricating system O, there being no tank interposed, a port 95 which connects by a pipe 17 to an oil operable clutch, and a port 96 which through a discharge pipe 18 discharges into a crankcase 4.

97 is a piston controlled by rod 34 having a control passage 98 whereby either ports 92 and 95 can be connected to engage the clutch or ports 95 and 96 to disengage it.

Normally the compression spring 93 which bears against bracket 94 and a stop 99 on rod 34 tends to connect the clutch port 95 with the discharge port 96.

Figure 14:
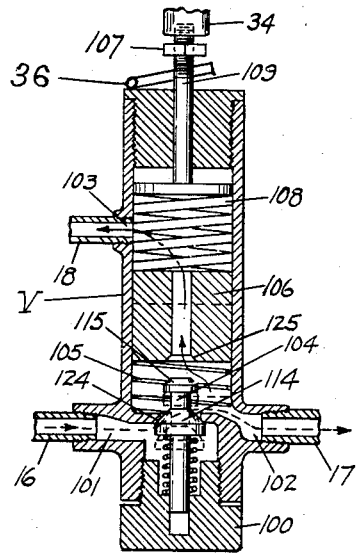
Fig. 14 is a vertical sectional view of my preferred type of control valve.

For various reasons, however, I prefer a type of three way valve such as shown at V in Fig. 14 wherein 100 is the valve casing, 101 the inlet from pipe 16 and 102 the outlet to pipe 17 which extends to the clutch C while 103 is the discharge outlet which, through pipe 18, discharges into crankcase 4.

104 is a movable valve stem with double heads 114 and 115 adapted to engage respectively the fixed seat 124 or the movable valve seat 125 depending on the movement of the tubular plug 106. This plug 106 is moved by the plug rod 109 and is cushioned by the spring 108 with which it moves.

A light compression spring 105 causes plug 106 and cushion spring 108 to move up together when pressure is removed from rod 34 which connects with plug rod 109.

The oil pressure on the clutch, up to the maximum, can be regulated and held by holding the foot and thus the control rod steady in some intermediate position.

When plug rod 109 is pushed down, oil flows from 101 to 102 as shown by the dotted arrow through seat 124 and when it is released, this conduit is closed and oil from the clutch flows back through 102 past 125 through plug 106, discharge passage 103 and discharge pipe 18 into the crankcase 4, as shown by the full line arrows.

107 is a stop nut by which the movements of valve stem 104 can be limited and regulated.

The control valve can be of any suitable type and may be immersed in oil in crankcase 4, as shown in Fig. 15. It may also be of the revoluble type having a casing 140 with a port 141 leading to oil inlet pipe 16, port 142 leading to clutch pipe 17 and port 143 which if the valve is located in the crankcase 4 serves as the discharge and does away with the necessity for discharge pipe 18.

The valve plug 144 has a suitable connecting port or channel 145 whereby the ports 141 and 142 or 142 and 143 can be connected by turning the stem 84 of plug 144. This can readily be done by extending stem 84 out through the crankcase and attaching to it an arm 85 pivoted at 86 to control rod 34.

L indicates the top of the oil in a crankcase 4.

In Figs. 1, 2, 3, 7, 8 and 9 are shown the most complete controlling mechanism for an automobile.

Y represents the steering post and D the brake pedal. The foot control mechanism B operative from foot board 5 includes a rod 34, compression spring 36 which engages finger 31 and button H which extends through the foot board 5.

Preferably, as shown in Fig. 3, button H is close to accelerator button X.

However, as shown in Fig. 4, it may take the place of the usual clutch pedal F at the left of the steering post or as shown in Fig. 6, the clutch pedal F may be entirely omitted, the operation of the clutch depending entirely on the action of control means B.

By pressing button H with the foot Z, whether the right foot as shown in Figs. 3 and 6 or the left foot as would be the case in Fig. 4, the rod 34 works against the spring 36 and thereby opens the passages in the valve V leading from the tank 11 or from any part of the oil pressure system O to the oil operable clutch such as C and when the pressure on button H is released the valve V is automatically returned to its normal position closing the connection to the oil pressure system and opening the passages from the clutch C through the discharge pipe 18 into the crankcase 4.

As shown in Fig. 6A, a three way valve such as W can be located almost anywhere for controlling the clutch. As there shown, instead of a rod 34, it has a stem 150 which projects through the instrument board 50 and can be operated by a hand or a knee.

However, if it is desired to provide an additional control which can be operated by a clutch pedal of the usual type such as F having the usual spring 134 which tends to move it back from the foot board 5, it may be done in the following way:

A rocker lever 30 is pivoted at 33 to the casing 2 and has one arm 130 in position to engage the finger 31 on rod 34 while its other arm 32 is pivoted to a connecting rod 35 also pivoted at clutch lever F. To lock this arrangement out of action, the foot plate 117 is pivoted and carries a hook 7 which can be engaged under a stop 8. This is done by tipping 7 down then pushing forward on 117 letting up and hooking behind 8, thus putting out of action pedal F.

If it is desired to use this pedal in the usual manner, hook 7 is released from 8 and F returns to the dotted position which through rod 34 and valve V releases the clutch.

This motion is the same as in the common type of mechanical clutch now in use, the left foot being used.

Ordinarily with the arrangement of button H close to accelerator X where both are controlled with the right foot, as shown in Figs. 3 and 6, when letting up on the accelerator, the clutch is disconnected and gears can be shifted in the usual manner, but there are occasions when it is desirable to have auxiliary arrangements.

When coasting, with the right foot off the accelerator button X and the clutch button H, whereby the engine and driving wheels are disconnected but the engine is idling, the car may gain so much momentum that with the foot brake on, it may be desirable to engage the clutch. This is accomplished by providing a pivoted foot rest for brake pedal D having a tail 9 which may be moved up or down by manipulating the foot rest, as shown in Fig. 7.

Ordinarily the tail 9 is stopped by a pin 60 and moves straight back over the top of the end of an arm 61 of a bell crank lever pivoted at 62 so that this lever is not moving.

However, by pressing on the top and thus depressing tail 9, it moves arm 61 down and arm 63 forward as shown by the dotted lines in Fig. 7 causing 63 to engage another finger 64 on rod 34 thereby opening the connections between the oil pressure system and the clutch thereby engaging the latter.

I find also that at very high speeds, the oil behind the diaphragm of the clutch is thrown forcibly outward with the result that unless very heavy springs are used, it is difficult to disengage the clutch plates. To avoid this difficulty, I prefer to use centrifugal pressure neutralizers such as are shown at R in Figs. 8 and 9.

Each spring 48 surrounds a pin 28 which passes loosely through a hole 128 in clutch plate 23A, its other end being pivoted at 120 to a weight 121 pivoted at 122 to plate 23A, the weight 121 and the pivots 120 and 122 and the other parts being so located that as the speed increases, the weights 121 press outward more and more forcibly thereby transmitting this pressure through the pins 28 to the plate 23 reinforcing the pressure of the springs 48 and thus counteracting to a substantial extent the centrifugal force.

As shown in Fig. 15, it is quite obvious that instead of tapping into the oil pressure lubricating system O, I might use a special pump 80 operated by any moving part such as the cam shaft 81 to supply pressure to a special tank 82.

Figure 16:
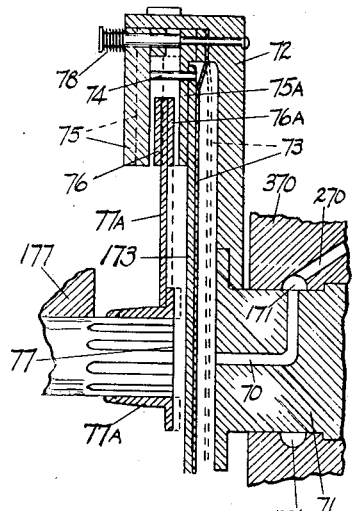
Fig. 16 is a vertical sectional view showing part of another type of clutch which I can use.

It is also clear that as shown in Figs. 16, I might reverse the process by carrying the oil under pressure into a conductor 70 in crank shaft 71 and providing the flywheel 72 with fixed clutch plate 75A and a diaphragm 73 including a disc 173 having pins 74 which engage the annular clutch plate 75 which is normally pressed towards clutch plates 76 and 76A carried by clutch plate carrier 77A slidable on clutch shaft 77 by compression springs 78 whereby the clutch is normally engaged. In this action, plate 76A engages 75A and 75 engages 76.

When oil pressure enters through passage 70 behind the diaphragm 73, through these pins 74, clutch plate 75 is moved away from 76 and, 76A is released from 75A thus disengaging the clutch.

171 is an annular channel in bearing 370 through which oil is fed from a conduit 270 connected with an oil pressure system.

Figure 18:
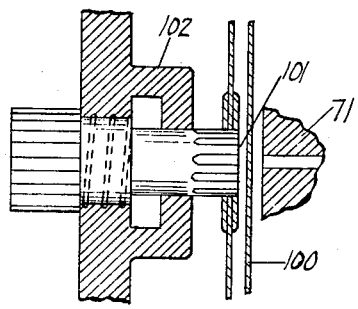
Fig. 18 is a vertical sectional view of another modification of certain parts of my device.

On newly designed cars, as the oil operative clutch is wholly self contained and the control valve can be located anywhere, the thimble 41 forming part of the flexible clutch diaphragm such as 40 in Figs. 8 and 9 can be omitted, as shown at 73 in Fig. 16 and at 100 in Fig. 18.

The end of the clutch shaft such as 77 in Fig. 16 or 101 in Fig. 18 can be shortened and cut off square and the bearing 177 in Fig. 16, or 102 in Fig. 18, can be brought closer to such end thereby supporting the shaft sufficiently without its end entering the end of the crank shaft such as 71.

There are many variations in the manner in which this device can be worked out.

Figure 17:
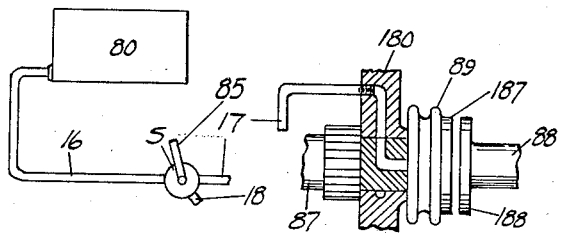
Fig. 17 is a diagrammatic side elevation showing another arrangement of certain parts of my device.

Various types of valves can be used and various methods of control from the foot board and while I prefer to use an air pressure tank for smoothness of operation, this can be dispensed with as shown in Fig. 17.

Where no tank is used, the pump itself to a certain extent gradually increases the pressure in the clutch thus avoiding a jerky operation and permitting the omission of the buffer spring.

As oil is always circulating in the device, any slight leaks are unimportant provided the oil does not get on the contacting surfaces.

The oil obviously can be introduced into an oil operative clutch member from the clutch shaft as well as from the crank shaft if desired and it is also clear that the type of clutch shown can be varied as by using a bellows clutch.

Fig. 17 shows some of these various modifications in which the air pressure tank is omitted and oil under pressure from pump 80 passes through line 16 to valve S thence to line 17 through a bearing 180 for clutch shaft 87 and into a bellows clutch member 89 carrying a clutch plate 187 which when the pressure is introduced is caused to engage a clutch plate member 188 on the end of crank shaft 88.

I claim:

1. The combination in an automobile having a clutch shaft, and a motor crank shaft; of an oil pressure system; with an oil pressure operable clutch between the motor crank shaft and the clutch shaft, said clutch including clutch plates carried respectively by the clutch shaft and the motor crank shaft, one of said clutch plates forming part of an oil pressure operable member carried by one of the shafts and which includes a diaphragm pressure chamber, a flexible diaphragm at substantially right angles to the shaft axis which diaphragm seals the diaphragm chamber, one of said clutch plates being positioned between the diaphragm and the other clutch plate and being so slidably held at its rim in the pressure operable member that pressure in the diaphragm chamber will cause this plate and the diaphragm to move in opposition to a clutch plate spring to engage or disengage it with the other clutch plate; a clutch control pipe from the oil pressure operable member to the oil pressure system; a three way clutch control valve in said clutch control pipe for controlling the supply of oil to said oil pressure operable member and the release of such oil therefrom; and means whereby the operator can control said valve.

2. The combination in an automobile having a clutch shaft, and a motor crank shaft; of an oil pressure system; with an oil pressure operable clutch between the motor crank shaft and the clutch shaft, said clutch including clutch plates carried respectively by the clutch shaft and the motor crank shaft, one of said clutch plates forming part of an oil pressure operable member, said member being equipped with centrifugal operable pressure neutralizing devices; a clutch control pipe from the oil pressure operable member to the oil pressure system; a three way valve clutch control valve in said clutch control pipe for controlling the supply of oil to said oil pressure operable member and the release of such oil therefrom; and means whereby the operator can control said valve.

3. The combination in an automobile having a clutch shaft, and a motor crank shaft; of an oil pressure system; with an oil pressure operable clutch between the motor crank shaft and the clutch shaft, said clutch including clutch plates carried respectively by the clutch shaft and the motor crank shaft, one of said clutch plates forming part of an oil pressure operable member carried by one of the shafts and which includes a diaphragm pressure chamber, a flexible diaphragm at substantially right angles to the shaft axis which diaphragm seals the diaphragm chamber, one of said clutch plates being positioned between the diaphragm and the other clutch plate and being so slidably held at its rim in the pressure operable member that pressure in the diaphragm chamber will cause this plate and the diaphragm to move in opposition to a clutch plate spring to engage or disengage it with the other clutch plate; a clutch control pipe from the oil pressure operable member to the oil pressure system; a three way clutch control valve in said clutch control pipe for changing the amount of flow and the pressure of the supply of oil to said oil pressure operable member and for releasing such oil therefrom; and means whereby the operator can control said valve.

4. The combination in an automobile having a clutch shaft, and a motor crank shaft; of an oil pressure system; with an oil pressure operable clutch between the motor crank shaft and the clutch shaft, said clutch including clutch plates carried respectively by the clutch shaft and the motor crank shaft, one of said clutch plates forming part of an oil pressure operable member, said member being equipped with centrifugal operable pressure neutralizing devices; a clutch control pipe from the oil pressure operable member to the oil pressure system; a three way clutch control valve in said clutch control pipe for changing the amount of flow and the pressure of the supply of oil to said oil pressure operable member and for releasing such oil therefrom; and means whereby the operator can control said valve.

RALPH H. KRESS.